(12) United States Patent
Trenh et al.

(10) Patent No.: US 11,165,989 B2
(45) Date of Patent: Nov. 2, 2021

(54) GESTURE AND PROMINENCE IN VIDEO CONFERENCING

(71) Applicant: Apple Inc., Cupertino, CA (US)

(72) Inventors: Johnny Trenh, San Jose, CA (US); Hsi-Jung Wu, San Jose, CA (US); Sarah K. Herrlinger, Cupertino, CA (US); Xiaoxia Sun, Cupertino, CA (US); Ian J. Baird, Cupertino, CA (US); Dazhong Zhang, Milpitas, CA (US); Xiaosong Zhou, Campbell, CA (US); Christopher M. Garrido, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 16/689,458

(22) Filed: Nov. 20, 2019

(65) Prior Publication Data

US 2020/0382745 A1    Dec. 3, 2020

Related U.S. Application Data

(60) Provisional application No. 62/855,806, filed on May 31, 2019.

(51) Int. Cl.
| | |
|---|---|
| *H04N 7/14* | (2006.01) |
| *G06F 3/01* | (2006.01) |
| *G06N 3/08* | (2006.01) |
| *H04N 7/15* | (2006.01) |

(52) U.S. Cl.
CPC .............. *H04N 7/147* (2013.01); *G06F 3/017* (2013.01); *G06N 3/08* (2013.01); *H04N 7/155* (2013.01)

(58) Field of Classification Search
USPC ............................................ 348/14.01, 14.09
See application file for complete search history.

(56) References Cited

U.S. PATENT DOCUMENTS

| | | | |
|---|---|---|---|
| 9,674,453 B1* | 6/2017 | Tangeland | H04N 5/232 |
| 2002/0093531 A1* | 7/2002 | Barile | H04N 7/148 |
| | | | 715/753 |
| 2012/0062729 A1* | 3/2012 | Hart | H04N 7/142 |
| | | | 348/135 |
| 2014/0259056 A1* | 9/2014 | Grusd | H04N 21/8133 |
| | | | 725/34 |
| 2015/0009279 A1* | 1/2015 | Vijayakumar | H04L 65/403 |
| | | | 348/14.09 |
| 2015/0049162 A1* | 2/2015 | Kurupacheril | H04N 5/23238 |
| | | | 348/14.08 |
| 2017/0280098 A1* | 9/2017 | Sethuraman | H04N 7/15 |
| 2020/0005028 A1* | 1/2020 | Gu | G06K 9/00389 |

\* cited by examiner

*Primary Examiner* — Maria El-Zoobi
(74) *Attorney, Agent, or Firm* — BakerHostetler

(57) ABSTRACT

Techniques are presented for managing for visual prominence of participants in a video conference, including conferences where participants communicate visually, such as with sign language. According to these techniques, a visual prominence indication of a participant in a video conference may be estimated, a video stream of the participant may be encoded, and the encoded video stream may be transmitted along with an indication of the estimated visual prominence to a receiving device in the video conference.

26 Claims, 6 Drawing Sheets

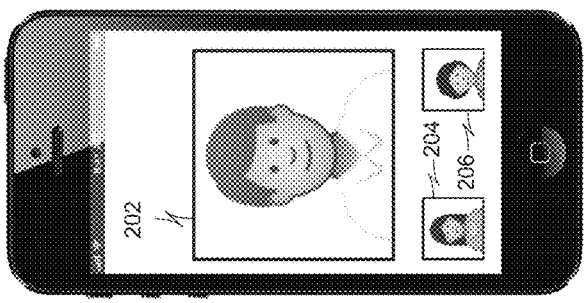
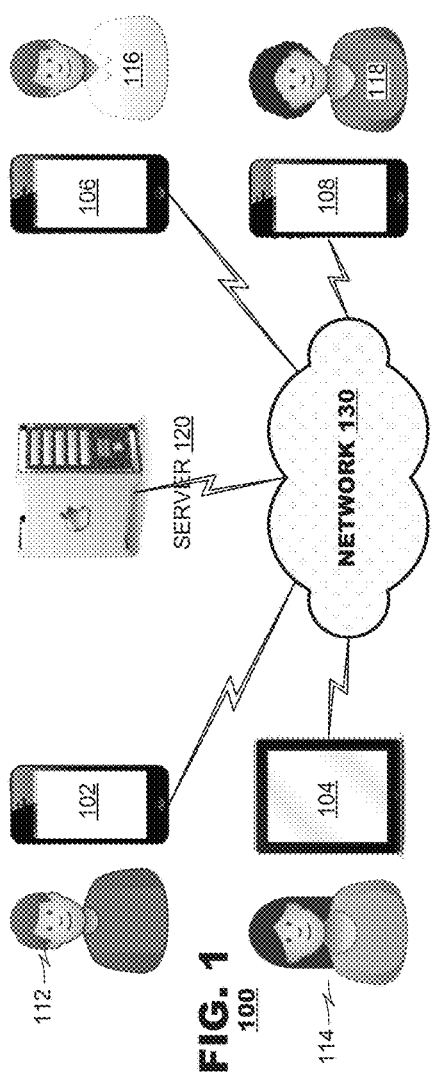
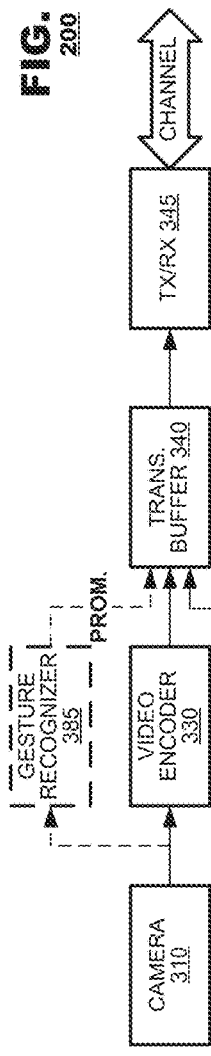
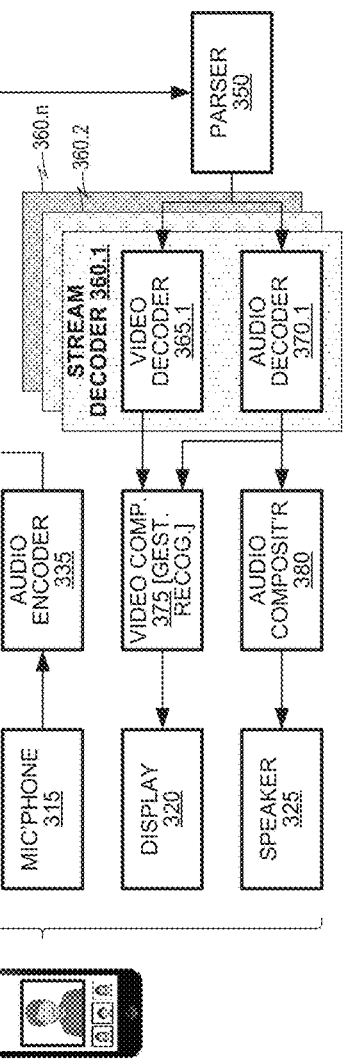

400

500

700

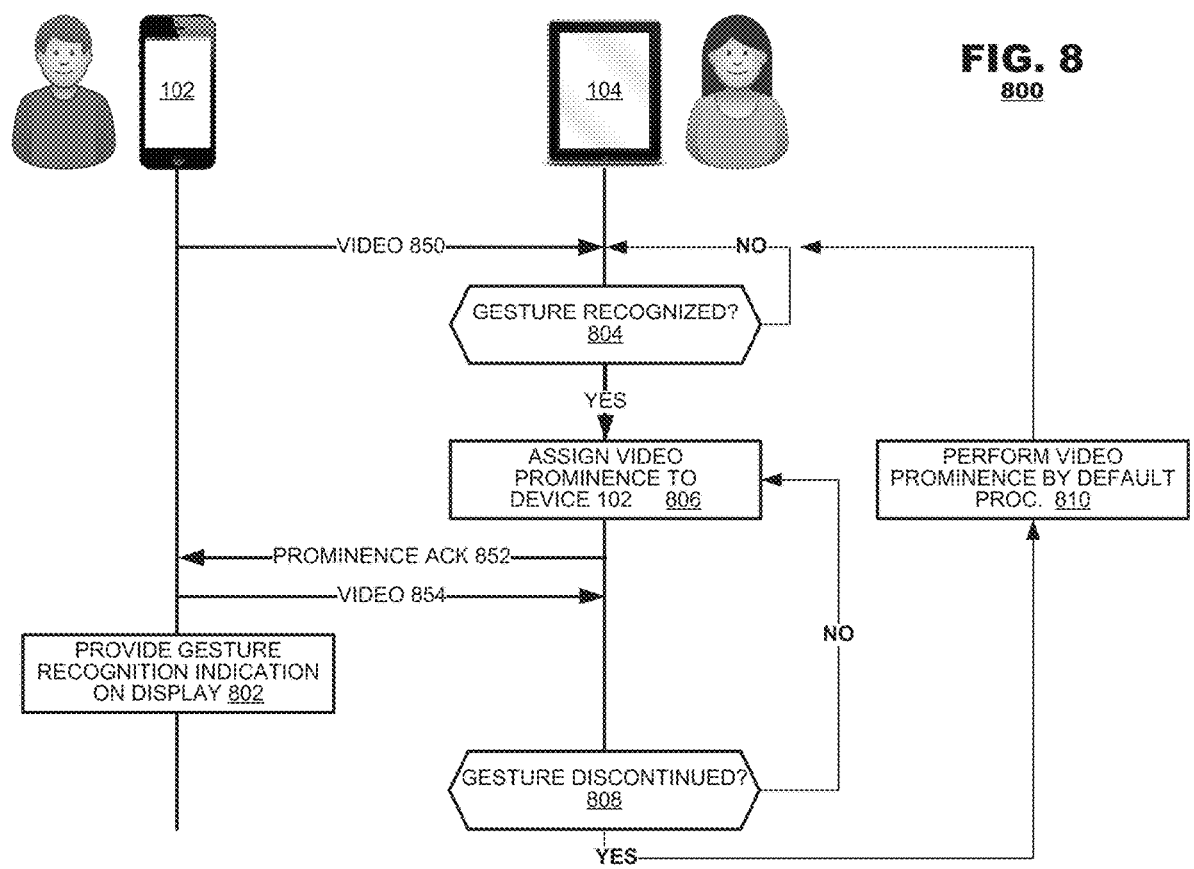

GESTURE AND PROMINENCE IN VIDEO CONFERENCING

CROSS REFERENCE TO RELATED APPLICATIONS

This application claims the benefit of priority under 35 USC 119(e) of U.S. provisional application No. 62/855,806, filed on May 31, 2019.

BACKGROUND

The present disclosure relates to video conferencing technologies.

In a multipoint audio conference, live audio input at conference source endpoint devices are shared as a conference with other receiving endpoints devices. Typically, each receiving device can hear the audio from every source device by rendering a mixture of audio from multiple source devices. In some cases, a human participant listing to the mixed audio may differentiate between simultaneous speakers as they would when people speak over each other during an in-person meeting. In other cases, an audio-conferencing system may improve clarify of communication by giving auditory prominence to one or a subset of streams from source devices, instead of mixing audio from all source devices equally. Auditory prominence may include attenuating the volume or muting the non-prominent audio sources. For example, a squelch mechanism may mute audio sources with lower audio input levels.

A multipoint video conference allows multiple live video feeds to be shared amongst conference participants. At each receiving device, video feeds of participants at captured at remote locations are typically presented in separate windows of a single display. A video conference may also include audio, which may be shared as in an audio conference, including squelching of non-prominent speakers.

BRIEF DESCRIPTION OF THE DRAWINGS

FIG. 1 depicts an example conferencing system.

FIG. 2 depicts an example device with display.

FIG. 3 is a block diagram of an endpoint device according to an aspect of the present disclosure.

FIG. 8 depicts an example flow diagram for prominence management at a consuming endpoint device.

DETAILED DESCRIPTION

Figure 4:
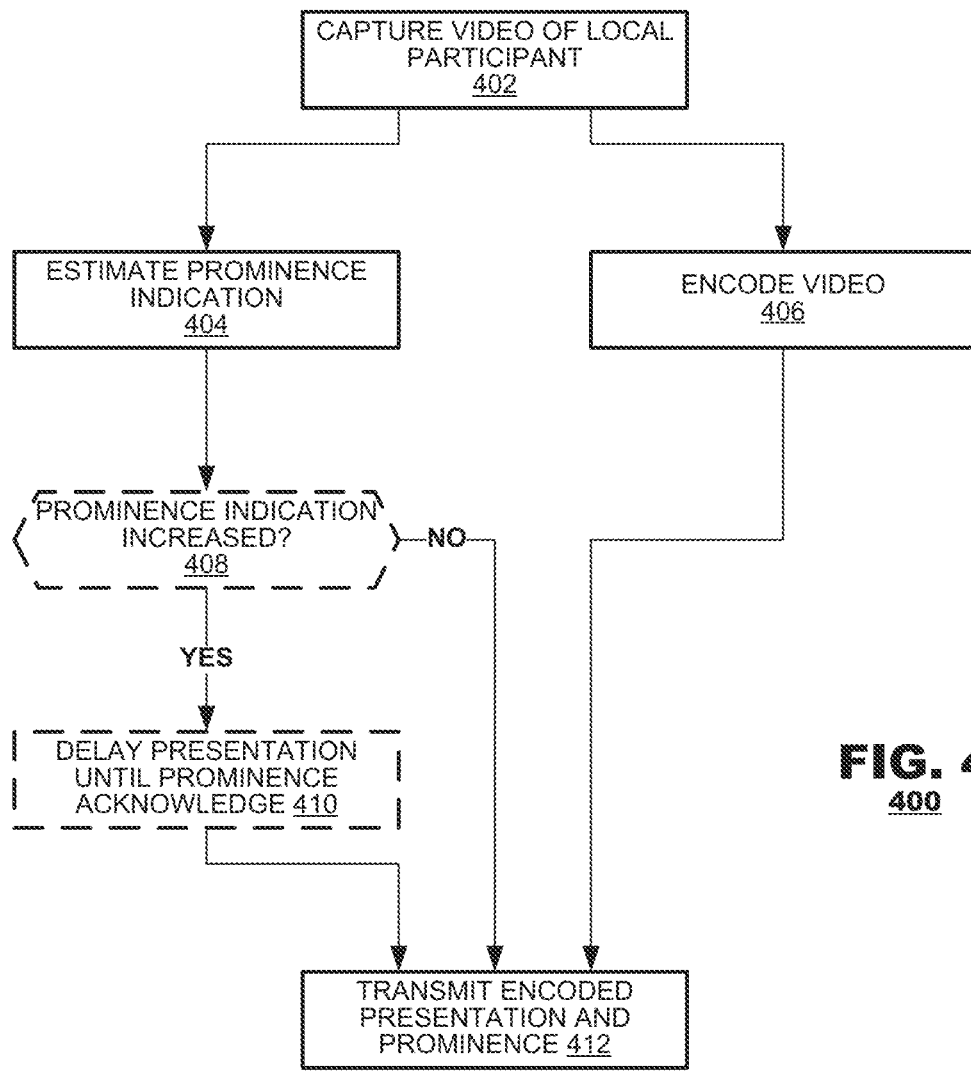
FIG. 4 depicts an example method for managing visual prominence in a video conference.

Aspects of the present disclosure provide techniques for visual prominence of participants in a video conference. These visual prominence techniques may find application, for example, in video conferences where communication is primarily visual instead of auditory, such as when a conference participant communicates with sign language or a visual prop. According to these techniques, an indication of a participant's visual prominence in a video conference may be generated, a video stream of the participant may be encoded, and the encoded video stream may be transmitted along with the visual prominence indication to a receiving device in the video conference. These techniques may provide more effective visual communication amongst the participants of a video conference.

FIG. 1 depicts an example conference system 100. In this example, the conference system 100 includes four conference endpoint devices 102-108, each with a respective participant 112-118 and connected via network 130. Each endpoint device 102-108 may capture audio/video data representing of participant(s) 112-118 at its location and may share the captured video with the other devices. Thus, an endpoint device 102 may act as a "source" endpoint device by capturing audio and video data representing a participant 112 and transmitting the audio/video data stream to the other devices 104-108, where the audio/video data is consumed. Similarly, the endpoint device 102 may act as a "consuming" endpoint device by receiving and rendering audio/video data provided by the other devices 104-108 of the videoconference. In this regard, it is common for a single device 102 to have multiple roles both as a "source" and a "consuming" device in a video conference.

Each consuming device (say, device 102) may render audio and video data representing the source device(s) 104-108 that supply audio/video data to it. Typically, a consuming device 102 will generate an audio output that represents a mixture of the audio data supplied by the other source devices 104-108. Similarly, a consuming device will render a video output that is composed from the video data supplied by the other source devices 104-108. While, in a simple application, it might be possible simply to blend the audio data supplied by a large number of source devices 104-108 with equal weight, it may not be possible to generate a video output representing the video data supplied by the source devices 104-108 with equal weight. Oftentimes, a consuming device 102 may give unequal weight to video from source devices. For example, as shown in FIG. 2, a consuming device may place video from one device in a display window 202 (called a "prominent window," for convenience) that is larger than display windows 204, 206 of other devices. In some applications where the number of devices in a videoconference is quite large (for example, five or more) video from some device participants may not be displayed at all.

Although the example of FIG. 1 illustrates four devices 102-108 that are members of the video conference, the principles of the present disclosure are not so limited. While, in practice, the number of devices that participate in a given video conference may be limited based on the processing resources and bandwidth available to devices, the principles of the present disclosure may work cooperatively with any number of devices 102-108 in a video conference. Similarly, while FIG. 1 illustrates exemplary devices as smartphones and tablet computers, the principles of the present disclosure find application with a wide variety of other equipment, including personal computers, laptop computers, notebook computers, media systems, gaming systems, and/or dedicated videoconferencing equipment. Moreover, the number, type(s) and topology of the network(s) 130 that interconnect the devices 102-108 are immaterial to the present discussion unless discussed hereinbelow.

FIG. 3 is a block diagram of a device 300 according to an aspect of the present disclosure. The device 300 may include a camera system 310, a microphone system 315, a display system 320 and a speaker system 325. As discussed, during a video conference, the camera system 310 may capture video data of a local environment, and the microphone system 315 may capture audio data of that local environment. Modern consumer electronic devices often include one or more cameras to capture video data, and they may include one or more microphones. The principles of the present disclosure find application with such implementations.

During a video conference, the display system 320 may render composite video representing video supplied by other source devices (FIG. 1), and the speaker system 325 also may render composite audio representing audio supplied by the other source devices (FIG. 1). Here again, the number and types of display devices and speaker devices may vary across different implementations of consumer electronic devices, and the principles of the present disclosure find application with such implementations.

FIG. 3 illustrates an exemplary processing system for transmitting captured audio and video data to other devices, which may include a video encoder 330, an audio encoder 335, and a transmission buffer 340. The video encoder 330 may perform video compression operations on video supplied by the camera system 310 to reduce its bandwidth for transmission to other devices. Typically, video encoders 330 exploit temporal and/or spatial redundancies in video data by coding elements of video differentially with respect to other elements of video data. Video encoders 330 often operate according to publicly-defined interoperability standards, such as the ITU-T H.26X series of coding standards, which define both coding operations and coding syntax for compression operations. The video encoder 330 may output coded video to a transmission buffer 340.

Similarly, the audio encoder 335 may perform audio compression operations on audio supplied by the microphone system 315. The audio encoder 335 may perform audio compression operations on audio that reduce its bandwidth for transmission to other devices. Typically, audio encoders 335 code audio elements differentially with respect to other elements of audio data. Interoperability standards also define coding operations and coding syntax for audio compression. The audio encoder 335 may output coded video to a transmission buffer 340.

The transmission buffer 340 may accumulate coded video data and coded audio data, and it may format the data according to a governing coding protocol. The transmission buffer 340 may output a coded data stream that includes the coded video and coded audio data to a transceiver 345 ("TX/RX") where it may be transmitted to a network 130 (FIG. 1).

FIG. 3 also illustrates an exemplary processing system for receiving coded data supplied by external source devices (not shown) to the device 300 for local rendering. Coded data may be received by the TX/RX 345 and forwarded to a parser 350, which detects different data elements within the coded streams and outputs them to stream decoders 360.1-360.n. The device 300 may possess a number of stream decoders 360.1-360.n each devoted to decoding of a coded data stream received from a respective source device (not shown). Thus, each stream decoder (say, 360.1) may possess a video decoder 365.1 and an audio decoder 370.1 to decoded coded video and coded audio from its source device. The parser 350 may relay the coded video and coded audio data elements to the video decoders 365.1-365.n and the audio decoders 370.1-370.n of the respective stream decoders 360.1-360.n.

The device 300 may include a video compositor 375 that receives decoded video from the video decoders 365.1-365.n of the stream decoders 360.1-360.n. The video compositor 375 may generate a composite video output from the decoded videos, and it may output the composite video to the display 320.

The device 300 may include an audio compositor 380 that receives decoded audio from the audio decoders 370.1-370.n of the stream decoders 360.1-360.n. The audio compositor 380 may generate a composite audio output from the decoded audio, and it may output the composite audio to the speaker system 325.

As discussed, aspects of the present disclosure provide techniques to integrate primarily-video communication data, such as sign language data, into composition operations of multi-party video conferencing systems. Such composition operations may respond to gesture detection performed on video streams to determine when primarily-video communication data (called a "recognized gesture" for convenience) is being received, and to provide indicators of such (called indicators of "video prominence" for convenience) from them. Video compositors 375 may use such video prominence indications when performing video composition operations.

In one aspect, a device 300 may include a gesture recognizer 385 as part of its video transmission processing path. A gesture recognizer 385 may receive video data from a camera system 310 and perform operations to determine if video data contains content relating to a recognized gesture. When a gesture recognizer 385 recognizes a gesture in video content, it may generate an indicator representing video prominence for the gesture. When the gesture recognizer 385 ceases to recognize gestures in video content, it may cease to generate indicators of video prominence. The video prominence indicator may be output to the transmission buffer 340, which may integrate the video prominence indication into a coded stream that is transmitted to other devices. In this regard, a source device may include metadata indicating the presence of recognized gestures in video content.

At a consuming device, a source device-supplied video prominence indicator may be passed to a video compositor 375. The video compositor 375 may respond to the video prominence indicator by selecting the video that contains the recognized gesture for display on the display system 320. For example, the video that contains the recognized gesture may be displayed in a prominent window 202 (FIG. 2) on the display system 320. In this regard, presence of the video prominence indicator may "over-rule" decisions that a video compositor 375 might perform in the absence of a video prominence indication. For example, many video compositor 375 operations are driven speaker detection processes which estimate which audio stream(s) contain audio data of an active speaker, and selecting an associated video stream for rendering in the prominence window 202 (FIG. 2). In response to a video prominence indication, a video compositor 375 may relegate video of active speaker(s) to non-prominent window(s) 204, 206 in favor of a video associated with the video prominence indication. When the video prominence indication ceases to be active for a video stream, the video compositor 375 may perform composition operations according a default operation, such as active speaker estimation.

In another aspect, a device 300 may include a gesture recognizer as part of the video compositor 375. In this aspect, source devices need not provide video prominence indications. Instead, video prominence estimations may be performed by consuming devices based on decoded video obtained from the stream decoders. In this aspect, a video compositor may perform gesture recognition on the decoded video streams to determine if recognized gesture(s) appear in any of the decoded video streams. If so, the video compositor 375 may selecting a video that contains the recognized gesture for display on the display system 320. Here again, a video prominence indication may "over-rule" decisions that a video compositor 375 might perform in the absence of a video prominence indicator. When a video compositor 375 ceases to recognize a gesture in the video stream, the video compositor 375 may perform composition operations according a default operation, such as active speaker estimation.

FIG. 2 depicts an example display 200 of an endpoint device. A consuming endpoint device may include a display 200 presenting windows of remote video conference participants. As depicted in FIG. 2, display 200 presents one large window 202, for example of a video feed of participant 116 at source device 106, above a row of smaller windows 206 and 204 of other participants' video feeds. In some aspects, when an endpoint device operates as both a source and consuming endpoint, one of the windows may present a video feed captured locally of a local conference participant, while the other windows may present video feeds or remote participants from remote endpoints.

In the display 200, the window 202 may be considered more prominent than the windows in row 204 due to its window 202's comparatively larger size. Prominence within a display may provide a visual focus point to a viewer of display 200, and visual communication may be more effective from a remote participant whose video feed is presented with the greatest prominence. Attributes other than window size of a video feed may also contribute prominence. Certain locations within display 250 may be more prominent. For example, window 202 is substantially centered in display 205, while windows in row 204 are positioned at the bottom of display 250, and window 202's central location give it more prominence and hence more effective communication to viewers of display 250. Other attributes of a video feed presentation that may contribute to the video feed's prominence may include an outline of a window that is thicker, flashing or in a highlight color, as compared to a smaller, static, or plain color of the outlines of other less prominent windows. Similarly, a prominent window 202 may be presented in a manner that is not obscured by other content whereas other, non-prominent windows 204, 206 may be obscured either partially or wholly by other content, including the prominent window 202. In some aspects, multiple prominence attributes may be combined by a prominence controller to give one or more video feeds prominence over other video feeds.

FIG. 4 depicts an example method 400 for managing visual prominence in a video conference. Method 400 may be performed, for example, at a source endpoint device. In method 400, video of a participant may be captured by a camera at a source endpoint device (box 402). The captured video may be encoded for transmission (box 406), and a prominence indication may be estimated (box 404). The estimated prominence indication may be transmitted along with the encoded video to receiving endpoint devices (box 412). In an aspect, if the prominence indication has increased (optional box 408), presentation by the participant may be delayed until prominence for the participant at a receiving endpoint has been acknowledged (optional box 410).

Method 400 may be implemented, for example, in a source endpoint device. Video of a local participant or visual presentation may be captured (box 402) by a camera embodied in, or attached to, the local source endpoint device. Video may be encoded (box 406), for example, to reduce bandwidth via video compression techniques resulting in an encoded bitstream. A prominence indication may be estimated in many ways as explained below, such as by analysis of the captured video to identify when a participant is attempting to communicate visually which may suggest that visual prominence of this participant over other participants is warranted. The prominence indication may be sent to receiving endpoints (box 412), for example by embedding the indication as side information in an encoded bitstream of the local participant's video feed or via a separate communication channel to the receiving endpoints. In an aspect, the indication of prominence may be sent contemporaneously with the portion of video indicating prominence. Alternatively, the indication for prominence indication may be sent prior to the portion of video where prominence is indicated (see discussion of delaying a presentation below).

In some aspects, a prominence indication may be estimated based on analysis of the locally captured video feed. For example, if a sign language, such as American Sign Language, is detected in the gestures of the participant captured in the video feed, the prominence indication may be estimated to be higher than that of a participant where sign language gestures are not detected. In some aspects, the indication of prominence indication transmitted in box 412 may be binary, for example, simply indicating if any sign language gestures where detected in a recent period of video. In other aspects, the indication of need may be a variable rating, for example corresponding to the number or frequency of gestures detected over a period of time.

In other aspects, the prominence indication may be estimated based on an explicit request for prominence from a participant. For example, a user interface button at a source device may be selected by the local participant to request prominence before commencing visual communication. In another example, a special hand gesture may be defined to indicate a request for visual prominence. Sign language communication may be preceded by such as special hand gesture. In an aspect, a prominence indication may be binary (yes/no), while in other aspects a prominence indication may be a variable rating such as a scalar value. A binary prominence indication may be determined, for example, based on further explicit input from a participant, such as selecting a user interface button to indicate the end of the prominence requires, or detection of a special hand gesture designated to indicate the end of a request for prominence.

Estimates of visual prominence indication may also be based on other factors such as a system designation of a particular participant as a primary speaker or moderator for the conference. A primary speaker or moderator may have a baseline or default prominence indication that is higher than other participants. Audio may also be used in determining a prominence indication. For example, the presence of high audio volume, or recognition of verbal speech, may increase an estimated prominence indication. A prominence indication may also be estimated from a combination of factors, such as a combination of an elevated based prominence indication for a moderator, an explicit request for prominence, and the frequency of detected sign language gestures over a recent period time.

A delay in a visual presentation, as in box 410, may be beneficial due to delays in adjusting visual prominence of video feeds at receiving devices, as well as additional delays in viewers response to visual prominence adjustments (e.g. choosing which participant window to look at after they windows move around). As compared to audio communication in an audio conference, a conference system's ability to change visual prominence may take longer than a squelch function in an audio conference, and a viewer's ability to switch visual focus in response to moving windows may require longer than switching audio attention from one speaker to another speaker.

Optionally, the prominence indication currently estimated in box 404 may be compared to previous estimates of the prominence indication of the same video feed or participant, such that an increased prominence indication may be identified in optional box 408. If an increased prominence indication is estimated, a presentation of participant may be delayed in optional box 410 as explained below until after the increased visual prominence indication is sent to a receiving endpoint. Such a delay may increase the likelihood that a remote participant at a receiving endpoint will see and interpret any visual communication from the local participant.

A delay may in visual presentation may occur in several ways. In a first aspect, when a source participant explicitly requests prominence, such as via a prominence request gesture, the participant may simply know to pause a moment or two before starting to sign. In a second aspect, after a request for prominence or an indication of increased prominence indication is sent to a receiving device, the local participant may be delayed from starting his or her visual presentation via a user interface indicator at the source device until an acknowledgment of increased prominence is received from the receiving device. A user interface indicator may an audio or visual cue to the local presenting participant that indicates a pause is necessary before remote viewers will be able to see any visual communication from the local participant. In a third aspect, upon determination of an increased prominence indication, without pausing the participants actual visual communications, a recording of the participant may be started. Then when visual prominence at a receiving terminal is determined, such as by reception at a source device of an prominence acknowledgement from a remote receiving device, transmission of the recorded video may be started. Compensation for the delay may occur by shortening the recoded video, such as by playing it at slightly increased speed, or cutting off an end portion of the recording when prominence switches to another participant.

In an aspect, some operations for management of visual prominence in a video conference may be done by a conference server that is separate from source or receiving endpoint devices. For example, operations 404, 408, and 412 of FIG. 4 may be performed at a conference server, where the conference server uses computer vision techniques to analyze source video from multiple source endpoints to determine the participant with the highest prominence indication. In an aspect, a conference server could then record or pause transmission of the video feed for the selected highest prominence participant until after receiving terminals have had an opportunity to adjust their displays for a new highest prominence video feed.

Figure 5:
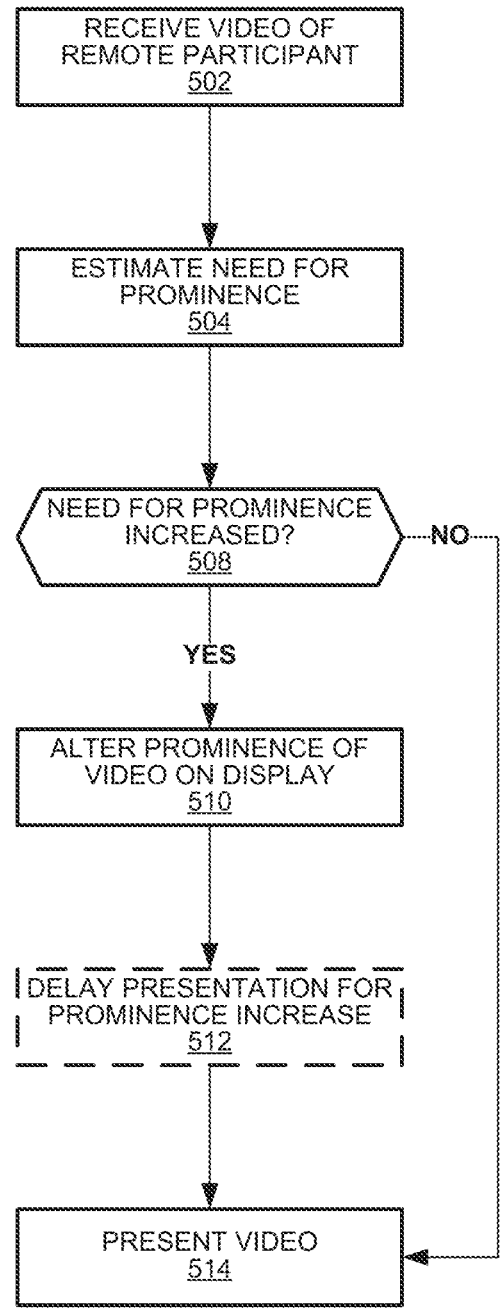
FIG. 5 depicts another example method for managing visual prominence in a video conference.

FIG. 5 depicts another example method 500 for managing visual prominence in a video conference. Method 500 may be performed, for example, at a receiving endpoint device. In method 500, a video feed of a remote participant may be received from a source endpoint (box 502), and a prominence indication for that received video feed may be estimated (box 504). If the prominence indication has increased (box 508), the prominence of the remote participants video feed may be accordingly altered (box 510), and remote participant's video feed may be presented with the altered prominence (box 514). Optionally, the video feed may be delayed until prominence a display has been updated to reflect the increased prominence of the remote participant (box 512). If the prominence indication has not increased (box 508), the remote participant's video feed may be presented without a change in prominence (box 514).

A prominence indication may be estimated (box 504) by analysis of the video feed at a receiving endpoint, from a prominence direction received from a conference server, from an indication prominence indication received from a source endpoint, or from a combination of these. Prominence of the video feed may be altered (box 510), for example, by increasing the window size for the video feed as compared to other windows on the display, by presenting the video feed on the display if it is not already displayed (video feeds of sufficiently low need for visual prominence may not be presented at all), or by other indicators of a video feed's prominence such as a distinctive border for the video feed window. A delay in presentation (box 512) may be affected by pausing presentation of the remote video feed until the prominence increase is completed, for example by recording the received video feed and starting presentation of the recording once the prominence increase is completed.

Figure 6:
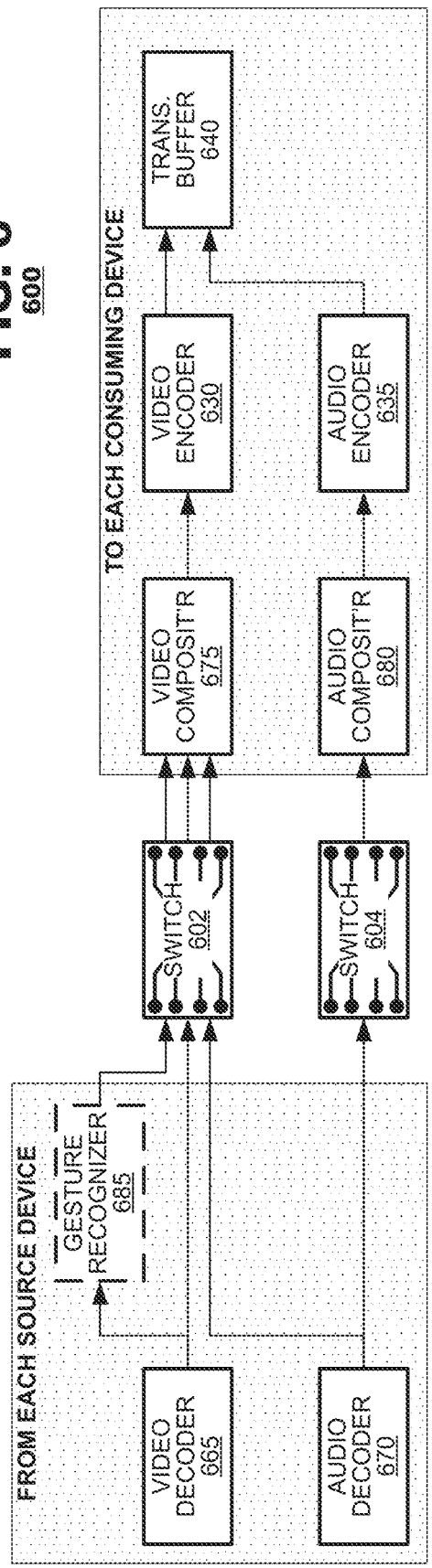
FIG. 6 depicts a block diagram of a conference server according to an aspect of the present disclosure.

FIG. 6 depicts a block diagram of a conference server 600 according to an aspect of the present disclosure. Conference server 600 may be an example of optional conference server 120 of FIG. 1. Conference server 600 may receive video streams from multiple source endpoints, composite them together and manage prominence amongst the streams in the process, and then send the composited stream to consuming devices. Such as system may aspects of enable visual prominence management at the conference server instead of at source or consuming endpoints.

Various server functional blocks of FIG. 6 may be similar to functional blocks of FIG. 3. FIG. 6 illustrates an exemplary processing system for receiving audio and video feeds captured at source devices, compositing the feeds, and transmitting the composited feeds to consuming devices. Server 600 may receive coded data from each source device by a network transceiver (not depicted), and provide parsed data elements of coded video and audio data to audio and video decoders 665 and 670, respectively. The server 600 may possess a number of video decoders 365 audio decoder 370 to decoded coded video and coded audio from a plurality of source devices. Switches 602 and 604 may provide decoded audio and video from a plurality of decoders 665 and 670 for feeds from a plurality of source devices into compositors 675 and 680. Server 600 may include a video compositor 675 that receives decoded video from switch 602 and an audio compositor 680 that receives decoded audio from switch 604. The video compositor 675 may generate a composite video output from the decoded video feeds, and it may output the composite video to the video encoder 630. The audio compositor 380 may generate a composite audio output from the decoded audio, and it may output the composite audio to the audio encoder 635.

The video encoder 630 may perform video compression operations on composited video supplied video compositor 675 to reduce its bandwidth for transmission to other devices. Typically, video encoders 630 exploit temporal and/or spatial redundancies in video data by coding elements of video differentially with respect to other elements of video data. Video encoders 630 often operate according to publicly-defined interoperability standards, such as the ITU-T H.26X series of coding standards, which define both coding operations and coding syntax for compression operations. The video encoder 630 may output coded video to a transmission buffer 640.

Similarly, the audio encoder 635 may perform audio compression operations on composited audio supplied by the audio compositor 680. The audio encoder 630 may perform audio compression operations on audio that reduce its bandwidth for transmission to other devices. Typically, audio encoders 635 code audio elements differentially with respect to other elements of audio data. Interoperability standards also define coding operations and coding syntax for audio compression. The audio encoder 635 may output coded video to a transmission buffer 640.

The transmission buffer 340 may accumulate coded video data and coded audio data, and it may format the data according to a governing coding protocol. The transmission buffer 640 may output a coded data stream that includes the coded video and coded audio data to a network transceiver (not depicted) for delivery consuming endpoint devices.

As discussed, aspects of the present disclosure provide techniques to integrate primarily-video communication data, such as sign language data, into composition operations of multi-party video conferencing systems. Such composition operations may respond to gesture detection performed on video streams to determine when primarily-video communication data (called a "recognized gesture" for convenience) is being received, and to provide indicators of such (called indicators of "video prominence" for convenience) from them. Video compositors 675 may use such video prominence indications when performing video composition operations.

In one aspect, a device 300 may include a gesture recognizer 685 as part of its video transmission processing path. A gesture recognizer 685 may receive video data video decoder 665 and perform operations to determine if video data contains content relating to a recognized gesture. When a gesture recognizer 385 recognizes a gesture in video content, it may generate an indicator representing video prominence for the gesture. When the gesture recognizer 385 ceases to recognize gestures in video content, it may cease to generate indicators of video prominence.

In addition to the conference server 600 of FIG. 6, other variation of servers 120 are possible. For example, a conference server 120 may include decoders and gesture recognition for indicating prominence, but not include video or audio compositors. In this example, the video prominence indicators for feeds from each source device may be output to the transmission buffer 340, which may integrate the video prominence indications into the coded streams for each respective source device that is then transmitted to consuming devices. In this regard, a server 120 may include metadata indicating the presence of recognized gestures in video feeds.

Figure 7:
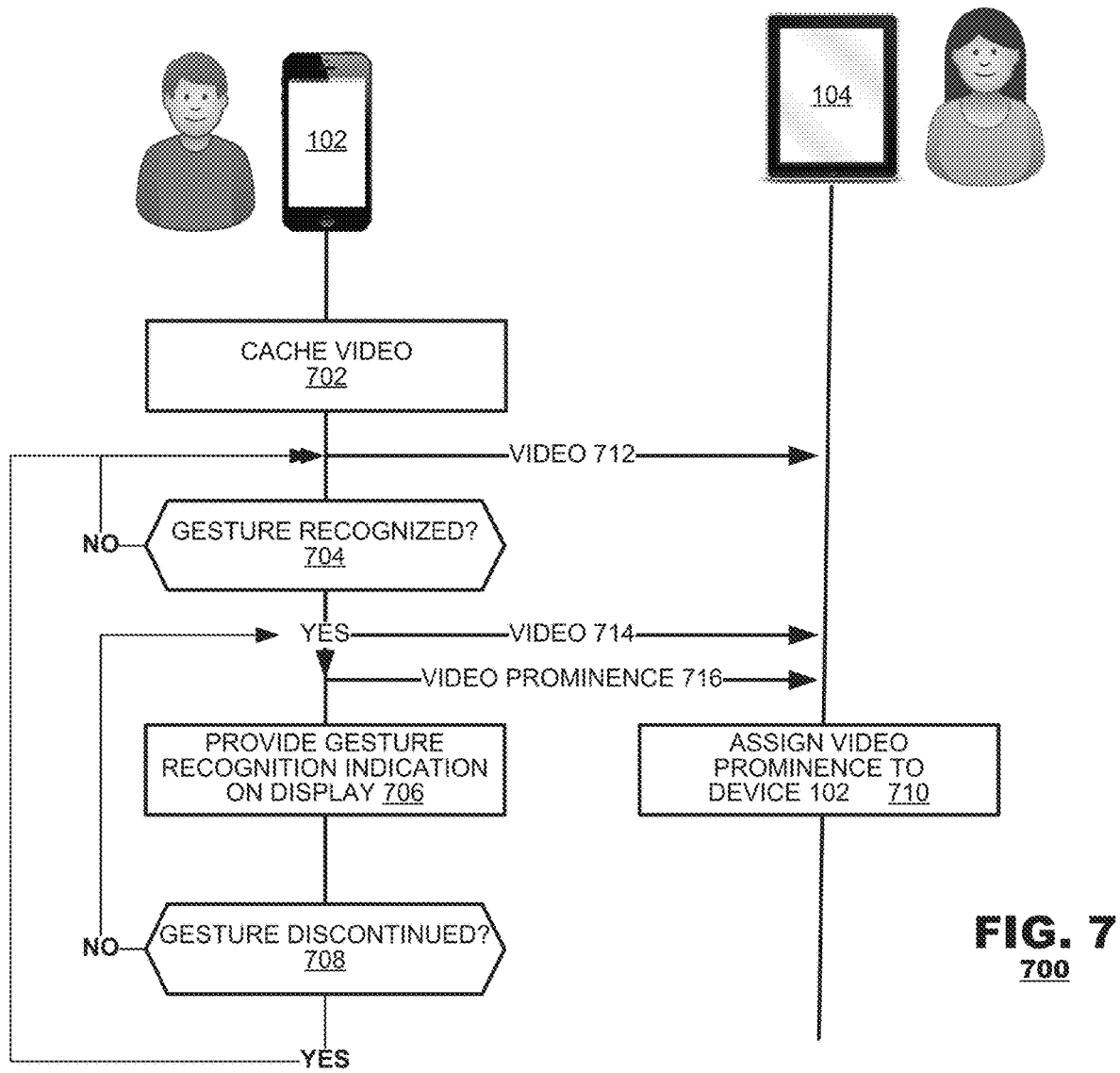
FIG. 7 depicts an example flow diagram for prominence management at a source endpoint device.

FIG. 7 depicts an example flow diagram 700 for prominence management at a source endpoint device. In this example, endpoint device 102 of FIG. 1 may operate as a source device, while endpoint device 104 of FIG. 1 operates as a consuming device for feeds from device 102. In flow diagram 700, video captured at device 102 may be cached (box 702) and sent to device 104 (message 712). Gesture recognition may be performed on the captured video sent to device 104 until a gesture is recognized (box 704). When a gesture is recognized, video may be sent to device 104 (message 714) along with a video prominence indication (message 716), and a user interface indication of gesture recognition or video prominence may be provided at source device 102, such as on a display of device 102 (box 706). Video prominence may continue to be transmitted along with video (messages 714 and 716) until it is detected that the gesture has been discontinued (box 708). When the gesture is discontinued, video may be sent (box 712) without video prominence. At device 104, received video feeds (messages 712 or 714) from device 102 may be assigned a prominence (box 710) based on any received video prominence messages (message 716). Video from device 102 may then be presented on a display of device 104 according to the assigned prominence.

FIG. 8 depicts an example flow diagram 800 for prominence management at a consuming endpoint device. In this example, endpoint device 102 of FIG. 1 may operate as a source device, while endpoint device 104 of FIG. 1 operates as a consuming device for feeds from device 102. In flow diagram 800, video feeds captured at source device 102 may be sent to consuming device 104 (message 850). Device 104 may perform gesture recognition, and when a gesture is recognized (box 804), video feeds from device 102 may be assigned a higher prominence for presentation (box 806). Video from device 102 may be presented on a display of device 104 according to the assigned prominence. After assigning prominence to device 102, acknowledgement of device 102's prominence may be sent back to source device 102 (message 852). In response to the received acknowledgement, a user interface indication of gesture recognition or video prominence may be provided at source device 102, such as on a display of device 102 (box 802). When recognized gesture is determined to have been discontinued (box 808), visual prominence for the video of device 102 may return to a default process (box 810).

The foregoing discussion has described operation of the aspects of the present disclosure in the context of conferencing endpoints. Commonly, these components are provided as electronic devices. Video encoders, decoders, analysis units, and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs include processor instructions and typically are stored in physical storage media such as electronic-, magnetic-, and/or optically-based storage devices, where they are read by a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A method for video conferencing, comprising:
   estimating, from captured video stream of a participant of a video conference, a non-binary visual prominence relating to the video stream of the participant;
   encoding the captured video stream of the participant;
   comparing the non-binary visual prominence to a prior estimated visual prominence of the same participant;

when the non-binary visual prominence has increased over a prior estimated visual prominence, transmitting, to a receiving device of the video conference, the encoded video stream and metadata separate from the coded video stream, wherein the metadata includes the an indication of the increased non-binary visual prominence.

2. The method of claim 1, wherein the generating is based on gesture recognition performed on the captured video.

3. The method of claim 2, wherein the gesture recognition is performed by a trained neural network.

4. The method of claim 3, wherein the neural network is trained to recognize a prominence request gesture made by the participant in the video stream.

5. The method of claim 1, further comprising:
when the visual prominence value increases, delaying a presentation of the video stream of the participant at the receiving device;
upon receiving acknowledgment of an increased visual prominence of the video stream of the participant at the receiving device, resuming presentation of the video stream of the participant at the receiving device.

6. The method of claim 5, wherein:
the delaying the presentation includes starting a recording at a first time in the video stream; and
the resuming presentation includes starting the transmitting of the recording at the first time.

7. The method of claim 5, wherein:
the delaying the presentation includes presenting a delay indication to the participant; and
the resuming presentation includes disabling the delay indication.

8. A method for video conferencing, comprising:
receiving a first video stream of a participant in a video conference;
recognize a hand gesture of the participant from analysis of images in the first video stream, wherein the hand gesture is predefined to indicate a request by the participant for visual prominence in the video conference;
determining a prominence level for the first video stream from the recognized prominence gesture;
presenting, on a display, the first video stream with the prominence level within the display amongst other video stream(s) of other participants in the video conference also presented on the display.

9. The method of claim 8, wherein the prominence level is determined from gesture recognition performed on the first video stream.

10. The method of claim 9, wherein the gesture recognition is performed by a trained neural network.

11. The method of claim 8, further comprising:
upon determining that the prominence level for the first video stream has increased,
pausing the presentation of the first video stream;
altering the presentation on the display to increase the prominence of the first video stream;
upon completing the altering of the presentation, resuming the presentation of the first video stream.

12. A system for video conferencing, comprising:
a camera for capturing a video of a conference participant;
an encoder to compress the captured video;
an analysis unit to detect a request by the conference participant for prominence from content of the captured video and to increase a prominence request indication in response to such detection;
a transmitter to send, to a receiving conference device, the compressed video and metadata, wherein the metadata includes the increased prominence request indication.

13. The system of claim 12, wherein the estimate is based on gesture recognition performed on the captured video.

14. The system of claim 12, further comprising a prominence controller to control prominence of the video at a receiving device by:
when the prominence indication increases, delaying a presentation of the participant at the receiving device;
upon receiving acknowledgment an indication of an increased visual prominence of the video at the receiving device, resuming presentation of the participant at the receiving device.

15. A system for video conferencing comprising:
a receiver to receive a video feed from a remote conference participant;
an analysis unit for recognizing a sign language gesture of the remote conference participant from analysis of images of the video feed and estimating a prominence level from the recognized prominence gesture, wherein the sign language gesture is predefined to indicate a request by the participant for visual prominence;
a controller to adjust the prominence of the received video feed amongst a plurality of video feeds based on the estimated prominence level; and
a display for presenting the video feed.

16. The system of claim 15, wherein the prominence level is estimated from gesture recognition performed on the first video stream.

17. The system of claim 15, wherein the controller alters the prominence of the received video feed by:
upon determining that the desired prominence for the first video stream has increased,
pausing a presentation of the first video stream;
altering the presentation on the display to increase the prominence of the first video stream;
upon completing the altering of the presentation, resuming the presentation of the first video stream.

18. A non-transitory computer readable medium storing instructions that, when executed by a processor, cause:
estimate, from images of the participant in a video stream of a video conference, a request for visual prominence of the participant;
encode the video stream of the participant;
transmit, to a receiving device in the video conference, the encoded video stream including metadata, wherein the metadata indicates the estimated request for visual prominence.

19. The medium of claim 18, wherein the generating is based on gesture recognition performed on the captured video.

20. The medium of claim 18, wherein the instructions further cause:
when the visual prominence indication increases, delaying a presentation of the participant at the receiving device;
upon receiving acknowledgment an indication of an increased visual prominence of the video stream at the receiving device, resuming presentation of the participant at the receiving device.

21. A non-transitory computer readable medium storing instructions that, when executed by a processor, cause:
receiving a first video stream of a participant in a video conference;
recognizing a sign language gesture of the participant from analysis of the first video stream, wherein the sign language gesture is predefined to indicate a request by the participant for visual prominence;
determine a desired prominence for the first video stream from the recognized prominence gesture;
presenting, on a display, the first video stream with the desired prominence within the display amongst other video stream(s) of other participants in the video conference also presented on the display.

22. The medium of claim 21, wherein the desired prominence is determined from gesture recognition performed on the first video stream.

23. The medium of claim 21, further comprising:
upon determining that the desired prominence for the first video stream has increased,
pausing the presentation of the first video stream;
altering the presentation on the display to increase the prominence of the first video stream;
upon completing the altering of the presentation, resuming the presentation of the first video stream.

24. The method of claim 1, wherein the generating of the visual prominence indication includes detecting a gesture of the participant by analysis of images of the captured video, wherein the gesture is predefined to indicate a request by the participant for visual prominence of the participant within conference.

25. A method for video conferencing, comprising:
generating, from captured video of a participant of a video conference, variable rating of a request for a visual prominence of the participant in the video conference;
encoding the video stream of the participant;
transmitting, to a receiving device of the video conference, the encoded video stream including metadata separate from encoded images, wherein the metadata includes an indication of the variable rating of request for the visual prominence.

26. A method for video conferencing, comprising:
transmitting, to a receiving device of the video conference, an encoded video stream including metadata, separate encoded images, including a prior visual prominence indication;
detecting, from captured video of a participant of a video conference, content indicating a request by the participant for visual prominence in the video conference;
responsive to detecting the content indicating the request for visual prominence, increasing a visual prominence indication relating to the captured video;
encoding the captured video of the participant; and
transmitting, to a receiving device of the video conference, the encoded video stream including metadata, separate from encoded video, including the increased visual prominence indication.

* * * * *